United States Patent [19]

Wright

[11] 4,166,086
[45] Aug. 28, 1979

[54] AERATOR FOR LIVE BAIT BUCKET

[76] Inventor: Earl B. Wright, 1307 Willow, Coffeyville, Kans. 67337

[21] Appl. No.: 902,026

[22] Filed: May 2, 1978

[51] Int. Cl.² .............................................. B01F 3/04
[52] U.S. Cl. ...................................... 261/93; D22/22; 43/57; 119/3; 210/219; 261/91; 261/121 M; 261/DIG. 27
[58] Field of Search ................. 261/87, 91, 93, 121 M, 261/DIG. 27, DIG. 75; 210/219; 43/56, 57; 119/3; D22/22; D23/35

[56] References Cited

U.S. PATENT DOCUMENTS

| D. 214,669 | 7/1969 | Wright | D22/22 |
|---|---|---|---|
| 1,894,864 | 1/1933 | Hall | 261/91 |
| 1,925,777 | 9/1933 | Sperling | 261/87 |
| 2,137,397 | 11/1938 | Haldeman | 43/57 |
| 2,194,037 | 3/1940 | Thuma | 261/91 |
| 2,261,830 | 11/1941 | Ditner | 43/57 X |
| 2,303,757 | 12/1942 | Pierson | 261/121 M X |
| 2,364,686 | 12/1944 | Balisteri et al. | 43/57 |
| 2,471,573 | 5/1949 | Lumpkin | 43/57 |
| 2,515,538 | 7/1950 | Wall | 261/121 M X |
| 2,641,455 | 6/1953 | Poirot | 43/57 X |
| 2,678,512 | 5/1954 | Maston | 43/57 |
| 2,892,543 | 6/1959 | Daman | 261/91 X |
| 2,951,309 | 9/1960 | Briscoe | 43/57 |
| 2,970,401 | 2/1961 | Hays | 43/57 |
| 2,998,671 | 9/1961 | Hinton | 261/121 M X |
| 3,189,334 | 6/1965 | Bell | 43/57 X |
| 3,283,478 | 11/1966 | Katzman et al. | 261/91 X |
| 3,323,249 | 6/1967 | Randall | 43/57 |
| 3,333,834 | 8/1967 | Brewster | 43/57 |
| 4,117,044 | 9/1978 | Durda et al. | 261/93 X |

FOREIGN PATENT DOCUMENTS 281144 6/1952 Switzerland ............................. 261/93

Primary Examiner—Richard L. Chiesa
Attorney, Agent, or Firm—Jones, Tullar & Cooper

[57] ABSTRACT

An aerator device for maintaining a high level of oxygen in live bait storage containers is disclosed. The aerator device comprises a cover for the container on which is mounted a suitable drive motor. The shaft of the motor extends downwardly through the cover and carries at its lower end an impeller which is driven by the motor at a high rate of speed to vigorously stir and aerate the water in the container. The upper portion of the shaft is enclosed by a housing which depends from the cover and extends down below the water level in the container. The lower end of the shaft and the impeller are surrounded by a relatively stiff screen having openings large enough to allow the free circulation of water, but small enough to prevent bait from reaching the impeller. Air inlets are provided on the cover and on the shaft housing to admit air to the interior of the housing.

2 Claims, 4 Drawing Figures

AERATOR FOR LIVE BAIT BUCKET

BACKGROUND OF THE INVENTION

The present invention relates in general to aerator devices and more particularly to an improved aerator structure for live bait containers.

Fisherman have long faced the problem of keeping their live bait in good condition over a long period of time, so that a day's fishing trip will not be cut short by loss of the bait. Numerous bait containers in the form of buckets, nets and the like have been devised over the years, but no really satisfactory method has been found for keeping bait such as minnows alive in any quantity for very long.

Most bait loss is caused by a lack of oxygen in the water of the bait container, for when a large number of minnows or other bait fish, for example, are placed in a conventional minnow bucket full of water, they quickly use up the available oxygen. A number of solutions to this problem have been proposed in the past, many of which have involved the use of air pumps of various designs to inject bubbles of air into the bait container. These devices have not been satisfactory, however, for in the typical arrangement the bubbles simply float to the top of the water, without supplying a significant amount of oxygen to the bait fish. Other solutions have involved the use of stirring devices, where an impeller is driven to cause the water in the bucket to flow. It appears that the purpose of these devices is simply to bring water from the bottom of the bucket to the top where it can interface briefly with the atmosphere to absorb oxygen. However, such devices do not put a significant amount of air into the water, and cannot satisfactorily support a large population of live bait.

In prior U.S. Pat. No. Des. 214,669, which issued on July 15, 1964 to the applicant herein, an aerator design was proposed which utilized an electric motor to drive an impeller. This device provided a steady circulation of water, but encountered the difficulties outlined above, and did not satisfy the need for an inexpensive, simple, lightweight aerator which would provide sufficient oxygen in a live bait container to keep the bait alive over a long period of time.

SUMMARY OF THE INVENTION

The present invention meets the foregoing objectives through the provision of a lightweight electric motor, which preferably is battery-powered, and which is mounted on a convenient support member such as a cover for a conventional minnow bucket or other bait container. The motor drive shaft extends down through the support member and carries at its lower end an impeller which is driven by the motor. The shaft is surrounded by a cylindrical housing which is mounted on the undersurface of the cover, and by a mesh screen secured to the lower end of the housing so that the screen encloses the impeller.

A plurality of air inlet slots are provided in the support member to allow atmospheric air to flow through the support to the interior of the cylindrical housing surrounding the shaft. Preferably the slots are spaced radially outwardly from the motor and extend arcuately around it to provide an even distribution of the air flow about the motor shaft. The air flow is facilitated by the provision of an additional set of air inlet openings formed in the wall of the cylindrical housing, above the normal water level in the bait container.

The impeller, which is mounted on the lower end of the motor shaft, consists of four flat blades which are trapezoidal in shape and which extend radially outwardly from and are spaced around the shaft, extending parallel to the axis thereof. The impeller is located a substantial distance below the surface of the water and is driven by the motor at a high rate of speed; e.g., between 500 and 600 RPM. The shape, location and speed of the impeller causes a rapid circulation of water to create a vortex, or whirlpool effect, in the water adjacent the shaft, strongly pulling the water down, and carrying with it a large quantity of air which is broken up into a multitude of very fine bubbles. These fine bubbles are carried downwardly by the circulating water and spread throughout the container. The small sizes of the bubbles maximize the water-air contact surfaces to provide a saturation level of oxygen in the water, while the circulation cools the water and aids in removing respiration and decomposition gases therefrom. This action furnishes a live bait environment which is superior to that of prior art devices, and permits maintenance of such bait over longer periods of time.

BRIEF DESCRIPTION OF THE DRAWINGS

The foregoing and additional objects, features and advantages of the present invention will become evident to those of skill in the art from a consideration of the following detailed description of a preferred embodiment thereof, taken in conjunction with the accompanying drawings, in which.

DESCRIPTION OF A PREFERRED EMBODIMENT

Figure 1:
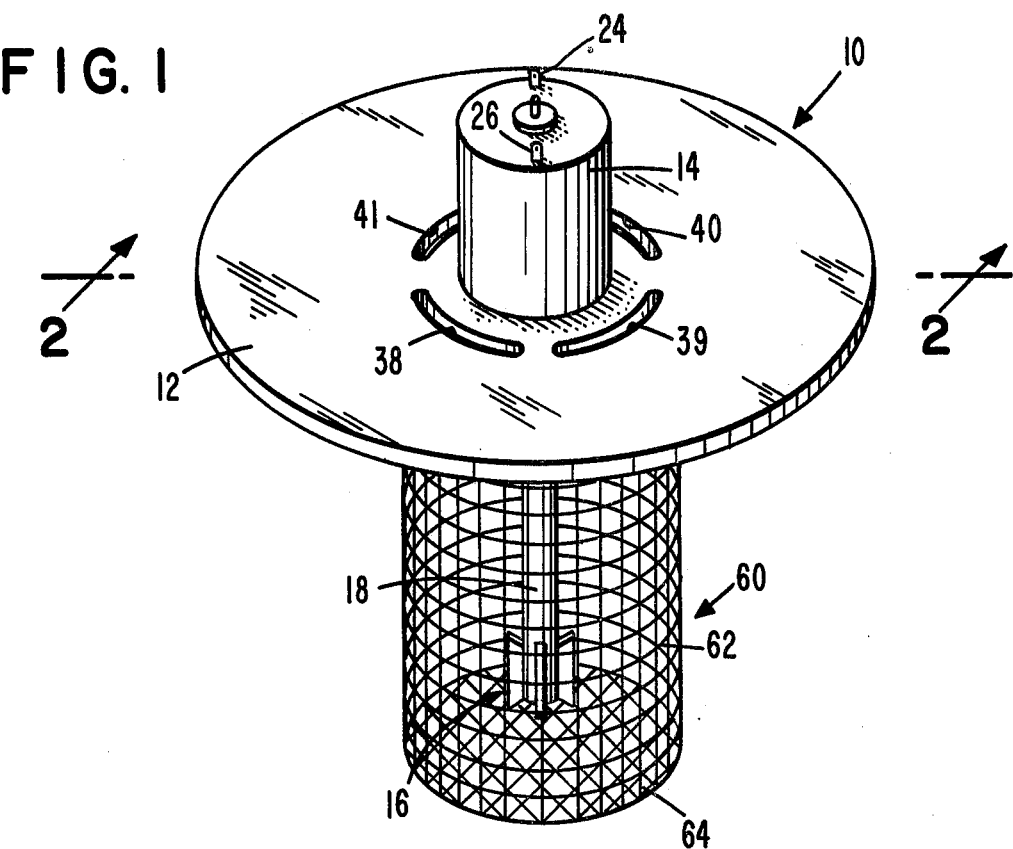
FIG. 1 is a perspective view of a preferred form of the invention.
Figure 2:
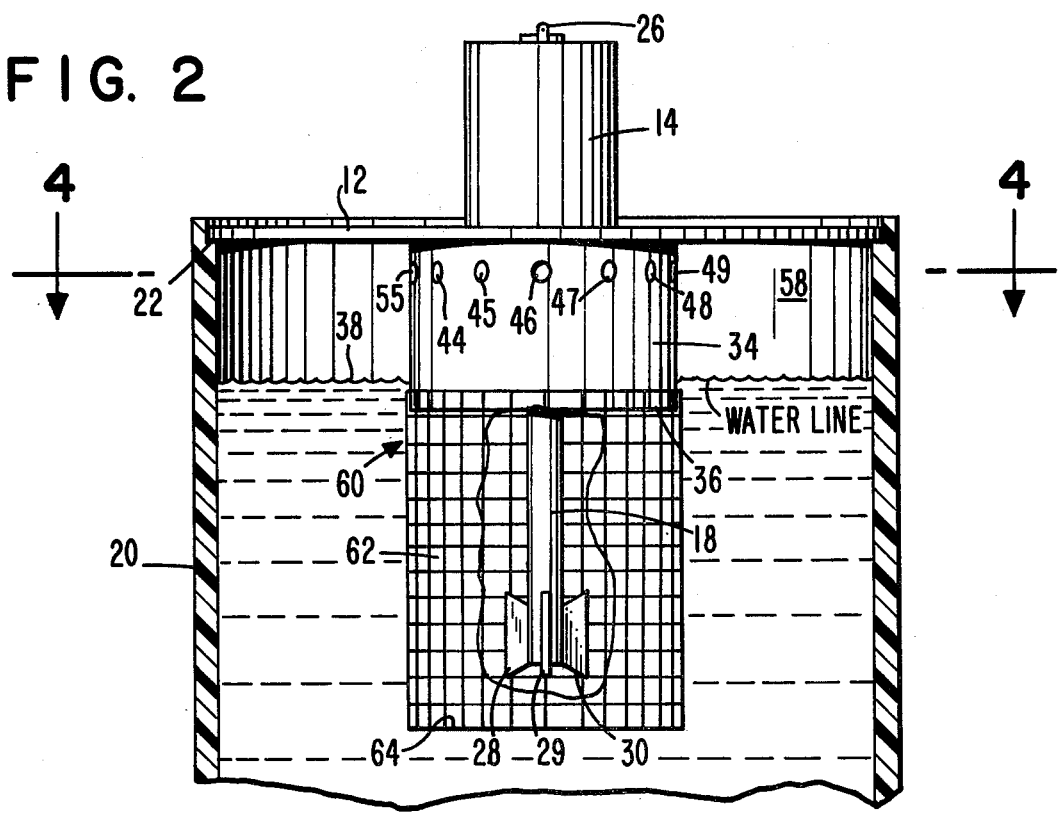
FIG. 2 is a side view of the device of FIG. 1, shown in partial cut away, and mounted in a bait container which is shown in section.
Figure 3:
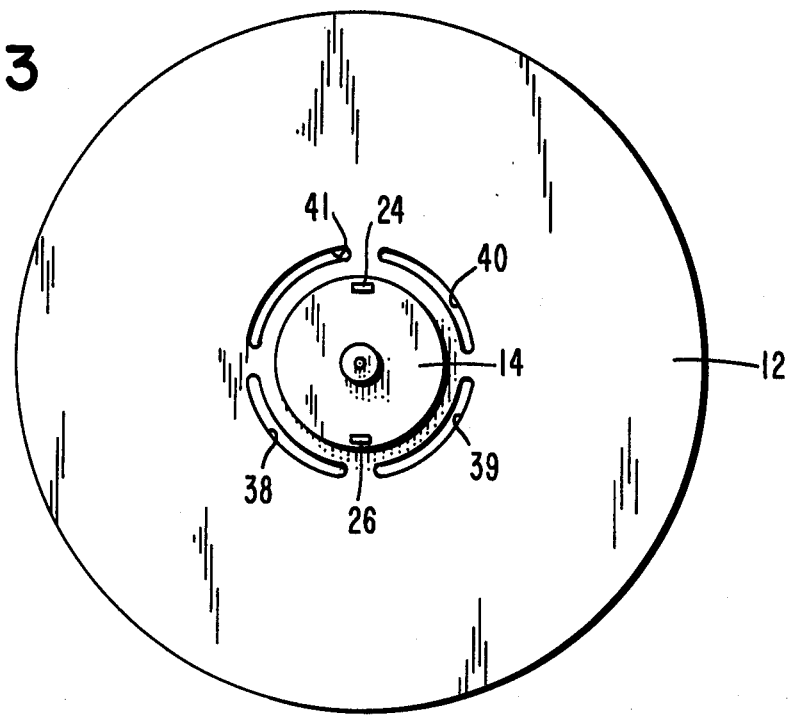
FIG. 3 is a top view of the device of FIG. 1.

Referring now to the drawings, there is illustrated in FIG. 1 a live bait aerator 10 constructed in accordance with the present invention and including a cover 12 for a bait container, a drive motor 14 mounted on the cover, and an impeller 16 carried by a shaft 18 connected to and driven by motor 14. As illustrated in FIG. 2, the cover portion 12 is sized and shaped to provide a covering for a live bait container of conventional construction. In the present illustration, this container is a small bait bucket 20 which is substantially cylindrical in shape, and accordingly the cover 12 is shown as being circular. It will be apparent, however, that containers of other shapes may be utilized with corresponding changes in the shape of cover 12. Preferably, the cover fits snugly on the container, fitting into a corresponding shoulder portion 22 on the upper edge of the container, for example, or simply resting on top of the container wall to prevent the lose of bait. Alternatively, the cover may fit over an access aperture formed in the lid for a bait container so that easy access to the container may be had simply by lifting the aerator.

The motor 14 is preferably a conventional, lightweight, high-speed, direct current motor which may be connected by way of terminals 24 and 26 to a conventional battery pack power supply for easy portability, or, if desired, to a conventional 12-volt marine battery of the type generally available in small boats. The motor preferably operates to drive the shaft 18 at a speed of 500-600 RPM while drawing a sufficiently small amount of current to be able to operate for up to 24 hours on a small battery pack utilizing, for example, two alkaline batteries.

Figure 4:
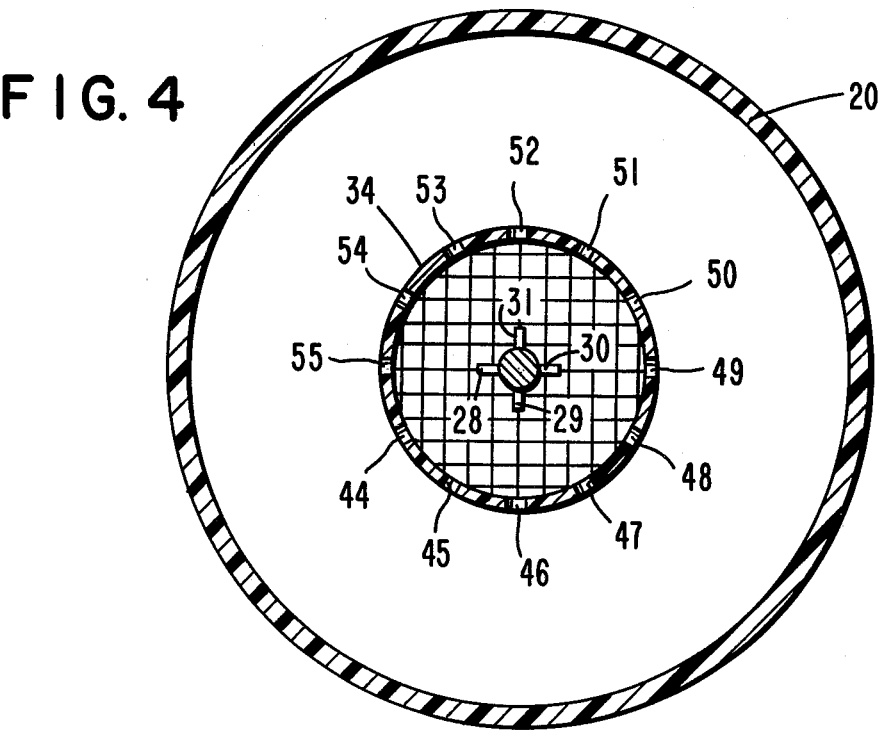
FIG. 4 is a sectional view of the invention, taken along line 4—4 of FIG. 2.

The impeller 16 secured to shaft 18 preferably consists of four trapezoidally-shaped blades 28, 29, 30 and 31 (see FIG. 4). The blades are spaced equally about the shaft and extend radially outwardly therefrom to provide the desired swirling motion of the water in the container when the device is operated.

Secured to and depending from the underside of cover 12 is a cylindrical shaft housing 34 which is coaxial with the shaft 18 and is spaced outwardly therefrom. The housing has a greater diameter than the motor 14, and extends downwardly from the cover a distance which is sufficient to position its lower edge 36 below the normal water level in container 20, as defined by the water line 38.

Located within the annular space defined by the outer surface of motor 14 and the inner surface of housing 34 are a plurality of arcuate slots 38, 39, 40 and 41 which extend through the cover 12 and connect the interior of housing 34 to ambient atmosphere so that air will be admitted to the interior of the cylindrical shaft housing. These air inlet slots 38-41 extend substantially fully around the circumference of motor 14 to provide a free flow of air into the aerator 10.

An additional flow of air is provided into the housing 34 by way of a plurality of inlet ports 44 through 55 spaced around the perimeter of the housing near the upper end thereof. These inlet ports allow a recirculation of air from the container space 58 between the water line and the cover 12 to the interior of housing 34 so that air bubbles released by the water can move freely into the housing for recirculation.

Secured to the bottom circumferential edge of housing 34 is a protective netting 60 having a cylindrical side wall 62 and a bottom wall 64 constructed from interwoven strands which form a fine mesh surrounding the impeller 16 and shaft 18. This netting or mesh may be constructed of cloth but preferably is of a relatively stiff material such as thin wire or relatively inflexible plastic or fiberglass fibers to insure that the mesh remains suitably spaced from the impeller so that it does not slow down the operation thereof. The spacing between the mesh filaments is sufficiently small to prevent the live bait from reaching the impeller and being injured thereby, yet is sufficiently large to permit an easy flow of air bubbles from the impeller into the container.

The cover 12 and the housing 34 may be constructed of any suitable lightweight, corrosion-free, yet strong material such as aluminum, fiberglass, polyethylene or other suitable plastic. Preferably the motor 14 is of waterproof construction so that it will be impervious to damage if it is accidentally submerged, or if it is exposed to rain, water spray and like conditions.

In operation, the aerator 10 is placed in a container which has been filled with water to a depth sufficient to cover the bottom edge 36 of housing 34 and so that the tops of the impeller blades 28-31 and approximately 1½ inches below the surface of the water. The motor is then energized, and the impeller is driven at a speed of between 500 and 600 RPM to cause a vigorous stirring and aeration of the water. The high rate of rotation of the impeller below the surface of the water not only circulates the water but causes a vortex to form above the impeller. This vortex pulls air down into and through the impeller and forces it into the water, with the high speed of rotation breaking up the air flow into very fine bubbles which are forced downwardly and outwardly to circulate throughout the entire volume of water within the container.

It has been found in actual tests of the present aerator that the vortex and consequent production of very fine bubbles provides a substantial and unexpected build up of oxygen in the water even though the bait container is loaded with live bait. More particularly, tests conducted using the standard Winkler method of determining the quantity of dissolved oxygen in water showed that the aerator 10 is capable of maintaining the maximum level of dissolved oxygen the water is capable of holding at a given temperature even when tested in a bait bucket which contains live bait. For example, with 77 minnows in approximately one gallon of water in a conventional bait bucket, the tests showed that the maximum level of dissolved oxygen was maintained for a period of approximately 16 hours at any reasonable water temperature. It was observed that the operation of the aerator in creating a vortex which pulls in air and circulates it to the bottom of the bucket in the form of small bubbles, where it tends to circulate freely for some time before the bubbles rise to the top and dissipate, not only provides maximum contact of the air with the water for efficient transfer of oxygen to the water, but also assists in removing respiration and decomposition gases from the water, thereby maintaining the live bait in good condition. This circulation of fine bubbles of air distinguishes the present aerator from prior devices which merely utilize an air pump bubbler or which merely stir the upper surface of the water.

The air which is circulated through the water in the form of bubbles but is not absorbed by the water is dissipated from the surface of the water and is returned to the interior of the housing 34 through ports 44-55, where it may again be drawn into the vortex, thus insuring a free circulation of the air through the water. This system of thorough and deep circulation of air into the water, utilizing the vortex process, offers a significantly greater benefit than other methods of aeration which use agitation only at the surface, or which use air pump systems. The fine bubbles created by the aerator and the consequent transfer of oxygen to the water thus serves to maintain an adequate bait environment for prolonged periods of time.

Thus, there has been described a new and unique aerator for live bait containers which is lightweight and inexpensive, yet which provides a more effective aeration of bait container water than previously available, and which thereby serves to keep the live bait in better condition over longer periods of time than was previously possible. Although the present invention has been described in terms of a preferred embodiment, it will be understood that its true spirit and scope is defined by the following claims.

What is claimed is:

1. An aerator device for maintaining a high level of oxygen in the water in a live bait storage container, comprising:
   cover means for the bait container;
   a lightweight, high speed, battery operated, electric drive motor mounted on the upper surface of said cover means, said drive motor being capable of operating at 500–600 RPM under battery power for a substantial period of time;

drive shaft means driven by said motor, said drive shaft extending downwardly through said cover means a distance sufficient to extend below the normal water level in the bait container;

impeller means secured to the lower end of said drive shaft, the top of said impeller being so located as to be approximately 1½ inches below the normal water level in the bait container;

shaft housing means depending from the under surface of said cover means, said shaft housing means being coaxial with said shaft and being spaced radially outwardly from said drive motor to define an annular space therebetween, said shaft housing extending downwardly from said cover means a distance sufficient to place its lower peripheral edge below the normal water level in the bait container;

a plurality of arcuate air inlet slots through said cover means, said inlet slots being located in said annular space between said motor and said shaft housing and extending substantially completely around said motor, said slots serving to admit ambient air into the interior of said shaft housing;

a plurality of air inlet ports spaced around the circumference of said shaft housing at the upper end thereof to admit air from within said container into the interior of said shaft housing;

screening means secured to the lower peripheral edge of said shaft housing and extending downwardly therefrom to surround said impeller means to protect live bait from the impeller; and means for applying electrical power to said drive motor for driving said motor and said impeller at a speed sufficient to vigorously circulate water in the bait container and to create a vortex in the water at the impeller, whereby air is drawn down into the vortex and dispersed into the water in the form of fine bubbles which are driven downwardly in the water within the container for circulation and absorption of oxygen, whereby the water is aerated and is maintained at a high level of dissolved oxygen.

2. The aerator of claim 1, wherein said impeller means comprises a plurality of trapezoidally-shaped blades mounted on said drive shaft.

* * * * *